G. E. WHITE.
MANIFOLD FOR INTERNAL COMBUSTION ENGINES.
APPLICATION FILED OCT. 14, 1918.
1,332,278.
Patented Mar. 2, 1920.
3 SHEETS—SHEET 3.
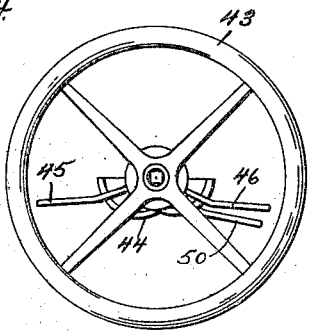
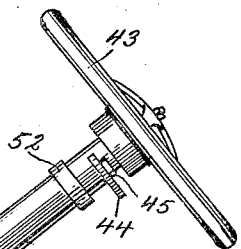
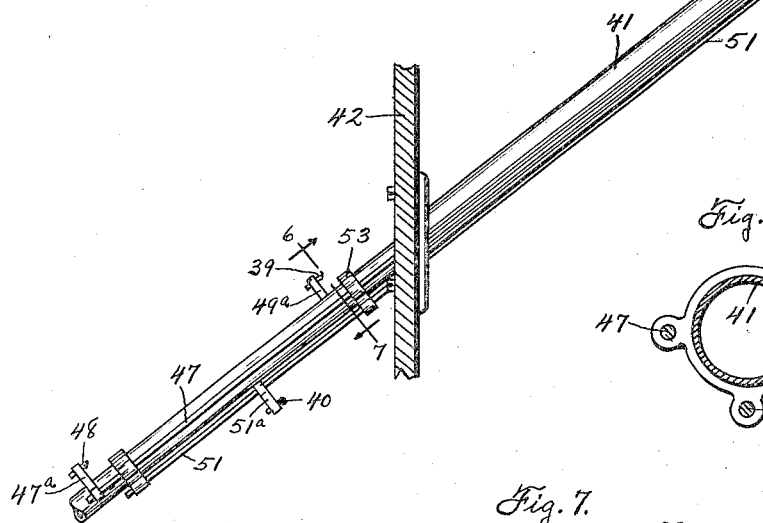
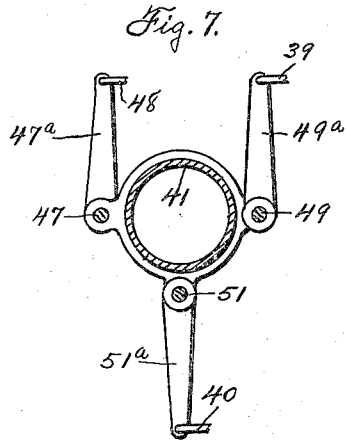
Inventor:
G. E. White
By Earl M. Sinclair
Atty.

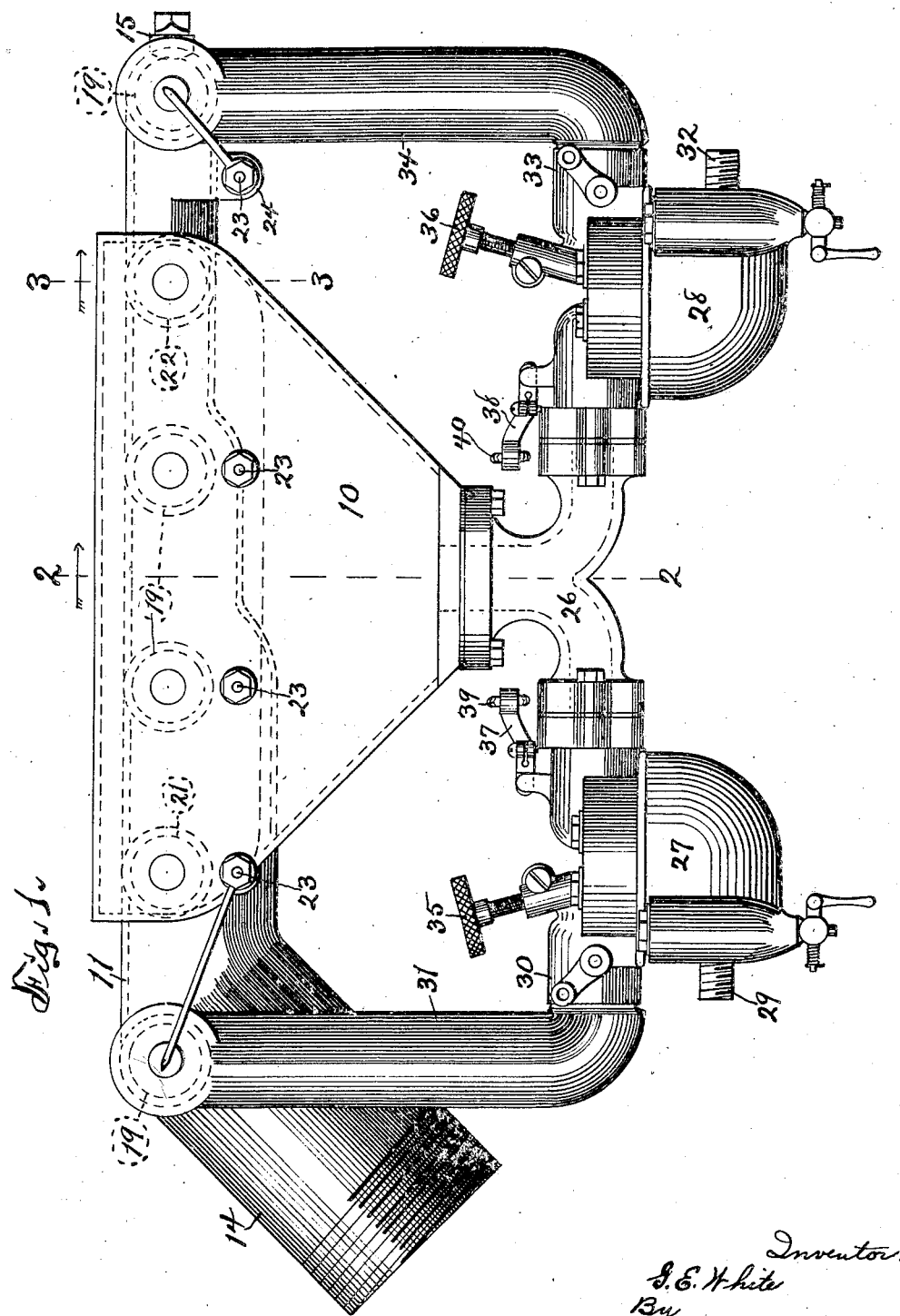

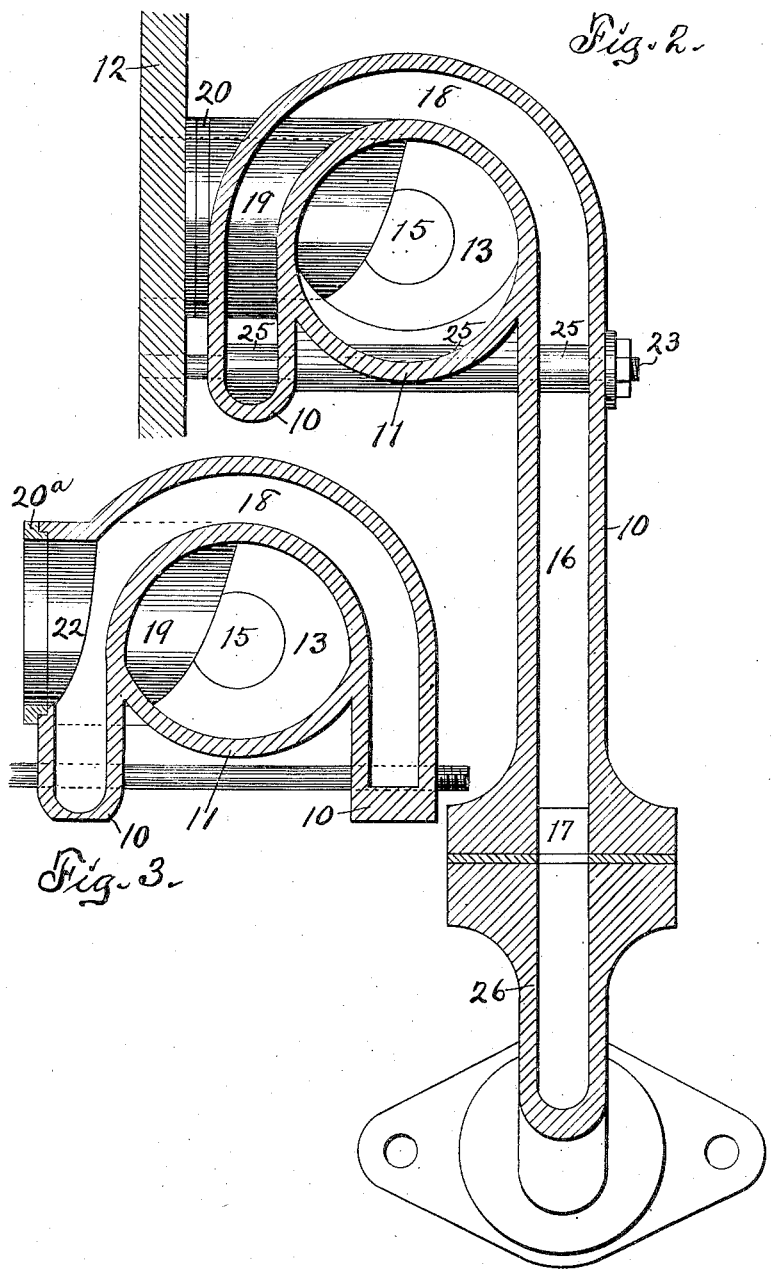

UNITED STATES PATENT OFFICE.

GILBERT E. WHITE, OF DES MOINES, IOWA.

MANIFOLD FOR INTERNAL-COMBUSTION ENGINES.

1,332,278.  Specification of Letters Patent.  Patented Mar. 2, 1920.

Application filed October 14, 1918. Serial No. 258,044.

*To all whom it may concern:*

Be it known that I, GILBERT E. WHITE, a citizen of the United States of America, and resident of Des Moines, Polk county, Iowa, have invented a new and useful Manifold for Internal-Combustion Engines, of which the following is a specification.

The object of this invention is to provide improved means for supplying oil vapor or gas to an internal combustion engine.

A further object of this invention is to provide improved means for superheating a fuel mixture prior to its introduction to an internal combustion engine.

A further object of this invention is to provide a combined integral device having the characteristics of an intake manifold for fuel mixtures and an exhaust manifold, heat radiated from the exhaust manifold serving to superheat the fuel mixture during its passage through the intake manifold.

A further object of this invention is to provide a combined integral device having the characteristics of an intake manifold for fuel mixtures and an exhaust manifold, heat radiating from the exhaust manifold serving to superheat the fuel mixture during its passage through the intake manifold, together with means for utilizing heat radiated from the exhaust manifold to the heating of air for different fuel mixtures prior to the creation of the mixtures.

A further object of this invention is to provide improved means for selectively controlling a plurality of carbureters having different sources of supply and arranged to discharge to a common intake manifold, said carbureters being adapted for treatment of fuel oils of different qualities.

My invention consists in the construction, arrangement and combination of elements hereinafter set forth, pointed out in my claims and illustrated by the accompanying drawing, in which—

Figure 1 is an elevation illustrating my improved manifold in association with two carbureters and heating means. Fig. 2 is a cross-section on an enlarged scale on the indicated line 2—2 of Fig. 1. Fig. 3 is a cross-section on an enlarged scale on the indicated line 3—3 of Fig. 1.

Fig. 4 is a view of the steering wheel and dual fuel controlling devices mounted adjacent thereto. Fig. 5 is a side elevation illustrating the steering column and the dual fuel controlling devices. Figs. 6 and 7 are cross-sections, looking in opposite directions, on the indicated line 6—7 of Fig. 5.

In the construction of the device as shown the numeral 10 designates generally an intake manifold and the numeral 11 designates generally an exhaust manifold adapted for use in association with a four-cylinder internal combustion engine, one wall of which engine is shown in part conventionally in Fig. 2 and designated by the numeral 12. In this instance the intake and exhaust manifolds are made in one piece by molding and the exhaust manifold is so shaped that it enlarges as to diameter from the front to the rear thereof in proportion to the increased load given to it by successive exhaust ports in the wall 12. The exhaust manifold 11 is formed with a chamber 13 substantially circular in cross-section and terminating at its rear end in an open elbow 14 to which an exhaust pipe of common form may be secured. A hole preferably is formed in and axially of the forward end portion of the exhaust manifold 11 and said hole is closed normally by a screw plug 15. The intake manifold 10 is also hollow, being formed with an upwardly diverging or longitudinally enlarging initial chamber 16 having an inlet opening 17 at its lower end and communicating in contiguity to and in front of the exhaust manifold with a curved chamber 18 extending across the front, over the top and downwardly across the rear of said exhaust manifold. The upper and side portions of the wall of the exhaust manifold constitute a radially inner wall of the curved chamber 18 or, in other words, constitute a partition between the intake and exhaust chambers. The exhaust manifold communicates with each cylinder of the engine at spaced points through exhaust ducts 19 leading laterally through the curved intake chamber 18. All of the exhaust ducts 19 are in the same horizontal plane and enter the manifold on horizontal curves toward the rear end 14, and are not curved vertically, thus lessening friction and back pressure of the exhaust gases. The ducts 19 (indicated by dotted lines in Fig. 1, one being shown in Fig. 2) are open at both ends, the inner ends of said ducts communicating with the chamber 13 and the outer ends thereof communicating with exhaust ports of the engine and being supplied with sealing means such as washers 20 of any suitable form, preferably flanged as shown in Fig. 3. The intake manifold communicates with the engine at two points 21, 22, shown by dotted lines in Fig. 1 and also in Fig. 3. The numeral 22 is employed to designate a port or passage adapted to register with a common port or passage in the engine wall 12 and be sealed thereto by any suitable means such as a common washer 20ª of flanged form. The chamber 13 may be of any suitable and desired size and shape proportioned to the load to be carried by it in the work of conveying and discharging exhaust from the engine cylinders and the chambers 16 and 18 may be of any suitable size and shape, being proportioned to the load imposed thereon in supplying the engine cylinders with fuel mixture; the matter of raising the temperature of the fuel mixture to the desired degree being given consideration in proportioning the size and shape of said chambers.

The combined integral manifolds may be mounted in any suitable manner on the engine wall and for such purpose bolts 23, in this instance four in number, are shown, which bolts are mounted in the engine wall and extend through protected holes in the manifolds, except as to the foremost bolt, which traverses an ear 24 on the exhaust manifold only. The holes in the manifolds through which three of the bolts 23 are mounted are protected from contact with the exhaust gases and intake mixture by integral housings or sleeves such as 25, preferably formed by molding in the manufacture of the manifolds.

An intake T 26 is fixed to and communicates through its lateral with the intake opening 17 of the intake manifold 10 and registering or alining arms of said T are adapted to be secured to and support carbureters 27, 28 of any suitable form. The carbureters 27, 28 are shown conventionally and follow designs now common and well known and in large general use on automobiles and motor driven vehicles and no specific description thereof will be undertaken other than to point out certain elements that are to be emphasized in this connection. The carbureter 27 preferably is employed in treating or using relatively heavy fuel oil such as kerosene which is admitted thereto through a pipe 29 and is mixed therein with air introduced through a neck member 30. This neck member 30 receives the discharge end of an air pipe 31, the opposite end of which pipe is flattened and expanded and overlies the elbow of the exhaust member and is suitably secured thereto in such manner that all or a considerable portion of the air introduced to the neck member 30 is drawn from the surface of said elbow and, consequently, is heated to a considerable degree after the engine has been running for a time, by radiation from said exhaust manifold. The carbureter 28 preferably is employed in treating or using relatively light and volatile fuel oil such as gasolene introduced thereto through a pipe 32 and mixed therein with air introduced through a neck member 33, which neck member receives the discharge end of an air pipe 34. The opposite end of the air pipe 34 preferably is flattened and expanded and overlies the initial end of the exhaust manifold 11 adjacent to the foremost exhaust port 12 of the engine and is arranged in such manner that all or a substantial part of the air introduced to the neck member 33 is drawn from the surface of the initial end of the manifold and is heated to the desired degree, after the engine has been operated for a time, by radiation therefrom. Any suitable means may be employed to hold the pipe 34 in position.

Needle valves 35, 36 of common form are used in the carbureters 27, 28 to adjust the flow of fuel oil to the mixing chambers therein and said valves may be adjusted or manipulated in any desired manner. Other valves of common form are mounted at the discharge ends of the carbureters 27, 28 and are here indicated by operating levers 37, 38 mounted on the outermost ends of the stems thereof. The operating levers 37, 38 respectively are pivotally connected to inner ends of connecting rods 39, 40 of common form, which connecting rods lead to manipulating or operating means shown on sheet 3 of the drawings and hereinafter described more in detail. It is the function of said other valves to govern and control the discharge of fuel mixture selectively from the carbureters to the intake manifold 10 through the T 26.

It will be observed that the exhaust manifold portion of the device is relatively straight from its front end to the elbow therein and that upward and downward bends at the ends commonly appearing in devices of this type are eliminated in this structure. An advantage lies in eliminating the bends as herein pointed out, in that the exhaust is given a straight course or path from each duct to the elbow and the streams of exhaust gases are turned directly toward the rear or elbow 14, and that the whole exhaust manifold portion is thus permitted to be placed in a lower plane. Such location of the exhaust manifold portion in a lower plane provides room and space for the overpassing curved chamber portion 18 of the intake manifold within the altitude relative to the engine wall, previously determined for such location of the manifold structure.

The construction and arrangement of the intake manifold portion 10 whereby it covers the front, top and rear of the exhaust manifold portion throughout the length or span thereof commonly allotted to an intake manifold, permits flattening and a relatively thin construction of the intake manifold which brings all of the contents of the chambers 16 and 18 clearly within the effective influence of heat radiated from the exhaust manifold portion, thus providing effective means for raising the temperature of the fuel mixture traversing said chambers to such degree as to produce maximum vaporization thereof and maintaining such maximum vaporization until said mixture is discharged into the explosion cylinders.

It is on account of this superheating and vaporizing function that consideration should be given to the relative thickness of the chambers 16, 18 and the proportioning of such thickness to the capacity required of the intake manifold.

By means of this construction and arrangement provision is made for employing the heavier and cheaper oils for fuel, and as such oils will volatilize into explosive gases at certain temperatures, which in general increase with the specific gravity of the oil, it is only necessary to insure the maintenance of such temperature, and the subjection of the oil to its influence prior to its injection into the engine cylinders, to make it possible to effectively employ them as fuel. It has been demonstrated also that in addition to providing a cheaper fuel this also tends to increase the horse-power of the engine as the heavier oils when successfully volatilized and in such condition injected into the engine cylinders actually produce more power than the lighter and more volatile oils and also are consumed more thoroughly and result in their explosions in the deposit of less carbon in the cylinders. It has also been demonstrated that the use of the heavier oils as fuel lessens the amount of lubricating or cylinder oil required by the engine, as in their own composition they include elements which act in this capacity and provide lubricating means in the cylinders.

The dual carbureting system makes it possible to use the heavier oil for general purposes and under normal condition and to employ the lighter and more volatile fuel, such as gasolene, for starting the engine and under unusual conditions. Independent controlling means are provided for the two carbureters in order that the supply of either fuel to the intake manifold may be regulated and controlled by the operator with ease and change may be made from one grade of fuel to the other practically instantaneously and without noticeable slackening in speed or loss of power in the engine. The means for manually controlling the dual carbureting system independently is shown in Figs. 4, 5, 6 and 7, in which the numeral 41 designates the steering column extending through the dash 42 to within reach of the operator of the vehicle and carrying at its upper end a steering wheel 43. 44 is the segment carried by the steering column 41 beneath the wheel 43, in frictional engagement with which, and on opposite sides of the column, are the hand levers 45, 46 commonly employed to regulate and control respectively the ignition spark and the fuel supply through the carbureter. In my construction and arrangement the spark lever 45 retains its normal function of regulating the position of the commutator through the lead rod 47 and connecting devices 48; and the throttle lever 46 is employed, through the throttle rod 49 and its connections with the connecting rod 39, to control the carbureter 27 and the supply of the main fuel mixture, as kerosene and air, to the engine. I have provided an additional throttle lever, 50, located beneath the segment 44 and on the same side of the steering column as the throttle lever 46, and said lever 50, which may be designated as the auxiliary throttle lever, is connected to a throttle rod 51 extending parallel with and beneath the steering column and secured at its lower end to the connecting rod 40, thus providing means for controlling the carbureter 28 and the supply of auxiliary fuel mixture, such as air and gasolene, to the engine cylinders. The auxiliary throttle lever 50 may be in frictional engagement with the lower or forward surface of the segment 44 and be convenient for manual actuation by the right hand of the operator in a manner similar to the main throttle lever 46. The throttle rod 51 has a bearing in a clip 52 secured to the upper portion of the steering column. Forward of the dash 42 a bearing clip 53 is mounted on the steering column and said clip has means for journaling the lead rod 47 of the spark control, the throttle rod 49 of the main throttle, and the throttle rod 51 of the auxiliary throttle, such construction being shown in detail in Figs. 6 and 7. In Fig. 7 are shown also the crank arms $47^a$, $49^a$ and $51^a$, by means of which, respectively, the lead rod 47 is operatively attached to the connecting devices 48 and the throttle rods 49 and 50 to the connecting rods 39 and 40.

Thus means is provided for independently controlling manually the dual fuel system and the two carbureters, and for readily changing from one source of fuel supply and one kind of fuel to another as conditions indicate.

I claim as my invention—

1. A combined intake and exhaust manifold for internal combustion engines, having an exhaust element relatively straight between its ends and provided with a series of exhaust ducts in the same plane and all lying within the space between the uppermost and lowermost margins thereof, in combination with an intake element relatively thin in cross-section and overlying the front, top and rear only of the exhaust element, said intake element being provided with ports in the same plane as the exhaust ducts, some of said exhaust ports extending through said intake element, at one side only of the exhaust element.

2. A combined intake and exhaust manifold for internal combustion engines, having an exhaust element relatively straight between its ends and provided with a series of exhaust ducts in the same plane and all lying within the space between the uppermost and lowermost margins thereof, in combination with an intake element relatively thin in cross-section and overlying the front, top and rear only of the exhaust element, said intake element being provided with ports in the same plane as the exhaust ducts, some of said exhaust ports extending through said intake element at one side only of the exhaust element, said intake element being of uniform length in all parts thereof contiguous to the exhaust element.

3. A combined intake and exhaust manifold for internal combustion engines, having an exhaust element relatively straight between its ends and provided with a series of exhaust ducts in the same plane and all lying within the space between the uppermost and lowermost margins thereof, in combination with an intake element relatively thin in cross-section and overlying the front, top and rear only of the exhaust element, said intake element being provided with ports in the same plane as the exhaust ducts, some of said exhaust ducts extending through said intake element at one side only of the exhaust element, said intake element being of uniform length in all parts thereof contiguous to the exhaust element, the initial end portion of said intake element converging to a center common to both elements and being provided with means for the supply of fuel mixture thereto.

Signed at Des Moines, in the county of Polk and State of Iowa, this 30th day of August, 1918.

GILBERT E. WHITE.